(12) United States Patent
Arbel et al.

(10) Patent No.: US 12,095,807 B1
(45) Date of Patent: Sep. 17, 2024

(54) SYSTEM AND METHOD FOR GENERATING CYBERSECURITY REMEDIATION IN COMPUTING ENVIRONMENTS

(71) Applicant: Wiz, Inc., New York, NY (US)

(72) Inventors: Itay Arbel, Tel Aviv (IL); Solal Raveh, Hod HaSharon (IL); Orr Shamli, Herzliya (IL); Chris Beckett, Bolton (GB); Ben Grynhaus, Tel Aviv-Jaffa (IL); Eyal Zisman, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/539,864

(22) Filed: Dec. 14, 2023

(51) Int. Cl.
*H04L 9/40* (2022.01)
*G06F 9/455* (2018.01)

(52) U.S. Cl.
CPC ...... *H04L 63/1441* (2013.01); *G06F 9/45558* (2013.01); *G06F 2009/4557* (2013.01); *G06F 2009/45587* (2013.01)

(58) Field of Classification Search
CPC .............. G06F 2009/45587; G06F 2009/4557; G06F 9/45558; H04L 63/1441
See application file for complete search history.

(56) References Cited

U.S. PATENT DOCUMENTS

| | | | |
|---|---|---|---|
| 9,584,541 B1 * | 2/2017 | Weinstein | H04L 63/1441 |
| 11,121,872 B2 | 9/2021 | Digiambattista et al. | |
| 11,539,748 B2 | 12/2022 | Digiambattista et al. | |
| 2018/0159887 A1 * | 6/2018 | DiGiambattista | G06F 21/577 |
| 2021/0334386 A1 * | 10/2021 | AlGhamdi | G06F 9/542 |
| 2022/0277075 A1 * | 9/2022 | Cummings | G06F 9/4411 |
| 2022/0345469 A1 * | 10/2022 | Domagalski | H04L 63/0236 |
| 2023/0300166 A1 * | 9/2023 | Zafar | G06F 21/552 726/23 |

OTHER PUBLICATIONS

Darshini P et al., "Cyber Security Threats Detection Analysis and Remediation" (Year: 2021).*

* cited by examiner

*Primary Examiner* — Phillip H Nguyen
(74) *Attorney, Agent, or Firm* — M&B IP Analysts, LLC

(57) ABSTRACT

A system and method initiating remediation actions in response to a cybersecurity issue in a computing environment is disclosed. The method includes: configuring a virtual instance in a computing environment to communicate with an inspection environment; configuring the virtual instance to receive in the computing environment a plurality of remediation scripts from the inspection environment; generating a remediation infrastructure including a plurality of remediation actions, each remediation action corresponding to at least a remediation script of the plurality of remediation scripts; detecting a cybersecurity issue in the computing environment; configuring the virtual instance to initiate a remediation action of the plurality of remediation actions, based on detecting the cybersecurity issue; and receiving a feedback in the inspection environment from the virtual instance in response to initiating the remediation action.

30 Claims, 9 Drawing Sheets

SYSTEM AND METHOD FOR GENERATING CYBERSECURITY REMEDIATION IN COMPUTING ENVIRONMENTS

TECHNICAL FIELD

The present disclosure relates generally to cybersecurity remediation, and particularly to providing a remediation infrastructure for a cloud computing environment.

BACKGROUND

Cybersecurity threats can be present in computing environments in various ways. For example, in cloud computing environments, some threats include vulnerabilities, misconfigurations, exposures, exploitations, and the like.

Various solutions exist which monitor computing environments for cybersecurity threats, including threat detection, digital forensic solutions, and the like. While monitoring often requires read-level access to a computing environment, remediation and mitigation require performing and initiating actions in the computing environment which typically need a higher level of permissions and access than simply read-level access.

For reasons such as this, remediation solutions are slow to be adopted since organizations are hesitant to allow a third party such access on a continuous basis. Alternatively, remediation solutions can be maintained and provided by the organization itself in the computing environment, however, this requires a specialization that is costly to maintain.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include configuring a virtual instance in a computing environment to communicate with an inspection environment. Method may also include configuring the virtual instance to receive in the computing environment a plurality of remediation scripts from the inspection environment. Method may furthermore include generating a remediation infrastructure including a plurality of remediation actions, each remediation action corresponding to at least a remediation script of the plurality of remediation scripts. Method may in addition include detecting a cybersecurity issue in the computing environment. Method may moreover include configuring the virtual instance to initiate a remediation action of the plurality of remediation actions, based on detecting the cybersecurity issue. Method may also include receiving a feedback in the inspection environment from the virtual instance in response to initiating the remediation action. Other embodiments of this aspect include corresponding computer systems, apparatus, and computer programs recorded on one or more computer storage devices, each configured to perform the actions of the methods.

Implementations may include one or more of the following features. Method may include: inspecting the computing environment for a cybersecurity object, where the cybersecurity object indicates the cybersecurity issue. Method may include: associating a first group of remediation actions of the plurality of remediation actions with a first group of user accounts; and associating a second group of remediation actions of the plurality of remediation actions with a second group of user accounts, where each group of user accounts is authorized to initiate only a remediation action associated with the respective user group. Method may include: disabling a first remediation action of the plurality of remediation actions. Method may include: detecting a condition in the computing environment; and disabling the first remediation action based on the detected condition. Method may include: enabling a second remediation based on the detected condition. Method may include: disabling a first remediation action of the plurality of remediation actions only for the first group of user accounts. Method may include: associating a first remediation action with the first user group, where the first user group is authorized to initiate the first remediation action only on a first preauthorized resource in the computing environment. Method may include: associating the first remediation action with the second user group, where the second user group is authorized to initiate the first remediation action on any resource in the computing environment. Method may include: associating the first remediation action with the second user group, where the second user group is authorized to initiate the first remediation action only on a second preauthorized resource, which is different from the first preauthorized resource. Method may include: generating an indicator value for each remediation action, the indicator value indicating a determined degree of disruption of the remediation action. Method may include: providing a permission to initiate a first remediation action to a first principal, in response to determining that a determined degree of disruption of the first remediation action is at, or exceeds, a threshold value. Method may include: providing the permission to the first principal only in response to detecting a condition in the computing environment. Method may include: configuring the virtual instance to receive a customized remediation script. Method may include: initiating a second remediation action, in response to the feedback indicating that the remediation action was unsuccessful. Method may include: generating a notification, in response to the feedback indicating that the remediation action was successful. Method may include: configuring the virtual instance to send a status report respective of the remediation infrastructure. Implementations of the described techniques may include hardware, a method or process, or a computer tangible medium.

In one general aspect, non-transitory computer-readable medium may include one or more instructions that, when executed by one or more processors of a device, cause the device to: configure a virtual instance in a computing environment to communicate with an inspection environment. Medium may furthermore configure the virtual instance to receive in the computing environment a plurality of remediation scripts from the inspection environment. Medium may in addition generate a remediation infrastructure including a plurality of remediation actions, each remediation action corresponding to at least a remediation script of the plurality of remediation scripts. Medium may moreover detect a cybersecurity issue in the computing environment. Medium may also configure the virtual instance to initiate a remediation action of the plurality of remediation actions, based on detecting the cybersecurity issue. Medium may furthermore receive a feedback in the inspection environment from the virtual instance in response to initiating the remediation action. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to configure a virtual instance in a computing environment to communicate with an inspection environment. System may in addition configure the virtual instance to receive in the computing environment a plurality of remediation scripts from the inspection environment. System may moreover generate a remediation infrastructure including a plurality of remediation actions, each remediation action corresponding to at least a remediation script of the plurality of remediation scripts. System may also detect a cybersecurity issue in the computing environment. System may furthermore configure the virtual instance to initiate a remediation action of the plurality of remediation actions, based on detecting the cybersecurity issue. System may in addition receive a feedback in the inspection environment from the virtual instance in response to initiating the remediation action. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: inspect the computing environment for a cybersecurity object, where the cybersecurity object indicates the cybersecurity issue. System where the memory contains further instructions which when executed by the processing circuitry further configure the system to: associate a first group of remediation actions of the plurality of remediation actions with a first group of user accounts; and associate a second group of remediation actions of the plurality of remediation actions with a second group of user accounts, where each group of user accounts is authorized to initiate only a remediation action associated with the respective user group. System where the memory contains further instructions which when executed by the processing circuitry further configure the system to: disable a first remediation action of the plurality of remediation actions. System where the memory contains further instructions which when executed by the processing circuitry further configure the system to: detect a condition in the computing environment; and disable the first remediation action based on the detected condition. System where the memory contains further instructions which when executed by the processing circuitry further configure the system to: enable a second remediation based on the detected condition. System where the memory contains further instructions which when executed by the processing circuitry further configure the system to: disable a first remediation action of the plurality of remediation actions only for the first group of user accounts. System where the memory contains further instructions which when executed by the processing circuitry further configure the system to: associate a first remediation action with the first user group, where the first user group is authorized to initiate the first remediation action only on a first preauthorized resource in the computing environment. System where the memory contains further instructions which when executed by the processing circuitry further configure the system to: associate the first remediation action with the second user group, where the second user group is authorized to initiate the first remediation action on any resource in the computing environment. System where the memory contains further instructions which when executed by the processing circuitry further configure the system to: associate the first remediation action with the second user group, where the second user group is authorized to initiate the first remediation action only on a second preauthorized resource, which is different from the first preauthorized resource. System where the memory contains further instructions which when executed by the processing circuitry further configure the system to: generate an indicator value for each remediation action, the indicator value indicating a determined degree of disruption of the remediation action; and provide a permission to initiate a first remediation action to a first principal, in response to determining that a determined degree of disruption of the first remediation action is at, or exceeds, a threshold value. System where the memory contains further instructions which when executed by the processing circuitry further configure the system to: initiate a second remediation action, in response to the feedback indicating that the remediation action was unsuccessful. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
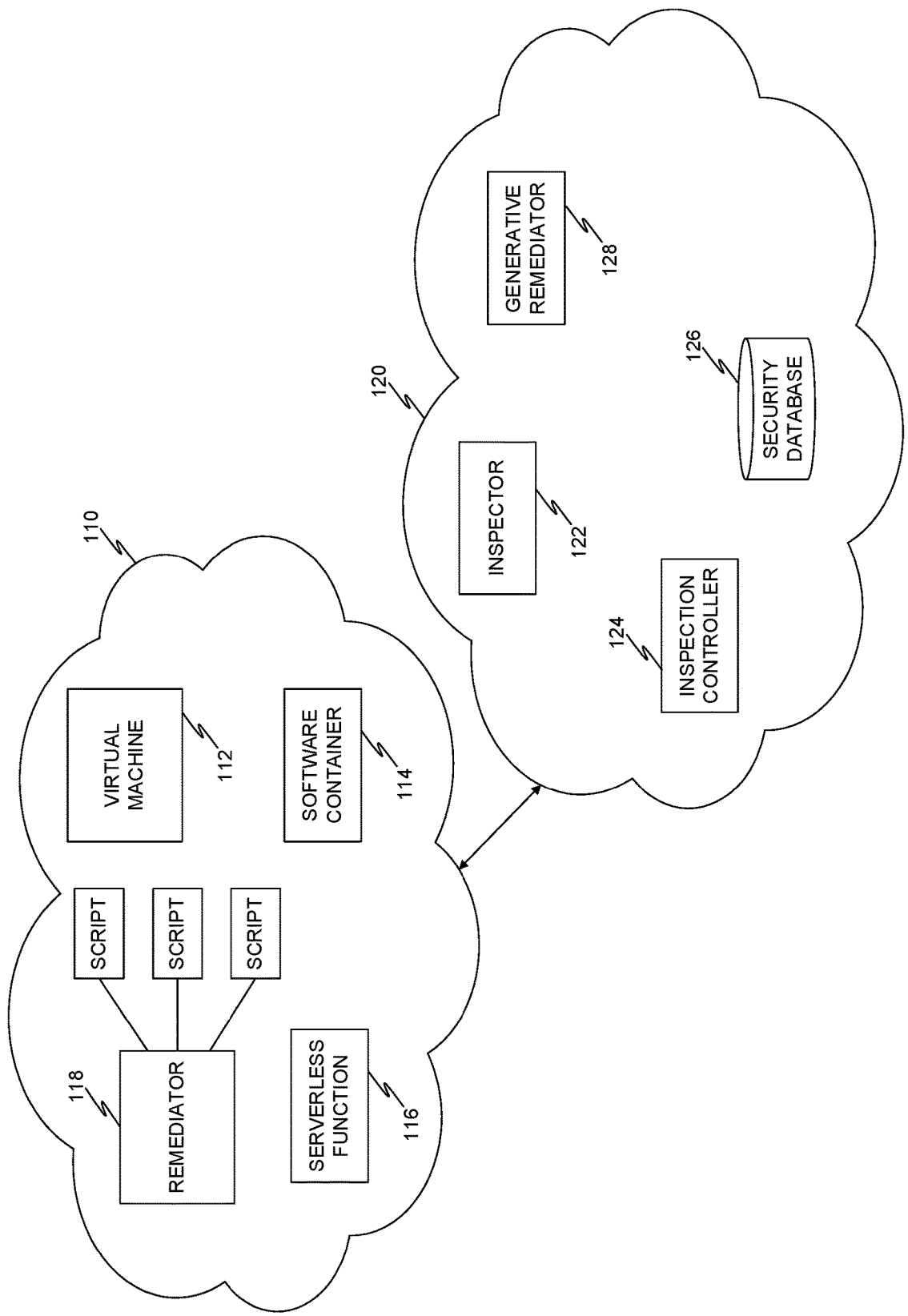
FIG. 1 is an example schematic diagram of a computing environment and an inspection environment with a generative remediator, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic diagram of a computing environment and an inspection environment with a generative remediator, implemented in accordance with an embodiment.

In an embodiment, a computing environment 110 includes a plurality of entities, such as resources, principals, and the like. For example, in an embodiment, the entities are cloud entities.

In some embodiments, the computing environment 110 is a cloud computing environment, an on-prem environment, a hybrid environment, a combination thereof, and the like. In certain embodiments, a cloud computing environment includes a virtual private cloud (VPC), a virtual network (VNet), and the like.

In certain embodiments, a cloud computing environment is deployed on a cloud computing infrastructure. In an embodiment, a cloud computing infrastructure is Amazon® Web Services (AWS), Google® Cloud Platform (GCP), Microsoft® Azure, and the like.

In certain embodiments, the computing environment 110 includes a plurality of resources, such as a virtual machine 112, a software container 114, a serverless function 116, various combinations thereof, and the like. According to some embodiments, a virtual machine 112 is, for example, Oracle® VirtualBox®, a software container 114 utilizes a Docker® Platform, and a serverless function 116 is Amazon® Lambda.

In some embodiments, the computing environment 110 includes a plurality of principals, such as user accounts, service accounts, local accounts, user groups, roles, various combinations thereof, and the like.

In an embodiment, a computing environment 110 is monitored by a cybersecurity inspection environment 120 (also known as inspection environment 120). In certain embodiments, the inspection environment 120 is implemented as a cloud computing environment, hybrid environment, on-prem environment, a combination thereof, and the like.

In an embodiment, the inspection environment 120 includes a plurality of inspector workloads, such as inspector 122. In some embodiments, the inspector 122 is configured to detect a cybersecurity object. For example, in an embodiment, an inspector 122 is configured to detect a cybersecurity object on a disk associated with a virtual machine 112. In an embodiment, an inspectable disk is generated, for example utilizing a clone, a copy, a snapshot, and the like, which are generated based on the disk of the virtual machine 112.

In some embodiments, the inspectable disk is inspected by the inspector 122. This allows to perform, for example, static analysis on the disk without perturbing the virtual machine 112 or utilizing resources thereof. In an embodiment, the cybersecurity object is a file, a secret, a password, a sensitive data, a code object, a hash, a key, a certificate, a registry file, a library, a software package, a binary, an application, an operating system, a malware, a nested workload, a combination thereof, and the like.

In certain embodiments, a cybersecurity object is utilized in detecting a cybersecurity risk. For example, in an embodiment, a secret, a password, and the like, are stored as cleartext, plaintext, and the like, which is readily accessible. In such embodiments, the secret, for example, is more exposed by storing it in this manner, and therefore presents a higher cybersecurity risk. In some embodiments, the secret provides access to another resource, thereby creating a cybersecurity risk of a lateral movement path.

In some embodiments, an inspection controller 124 is configured to utilize a service account in the computing environment 110 to initiate generation of the inspectable disk. In certain embodiments, the inspection controller 124 is configured to generate inspector workloads, such as the inspector 122, in response to demand for inspector workloads. For example, in an embodiment, the inspection controller 124 is configured with a permission to instantiate a virtual instance which executes an application configured to inspect an inspectable disk for a cybersecurity object.

According to some embodiments, an inspector 122 is configured to store data, information, and the like, pertaining to cybersecurity objects, inspection, etc. in a security database 126. In some embodiments, the security database 126 includes a constraint, a predefined data schema, and the like, which is utilized to represent the computing environment 110.

In some embodiments, a data schema of the security database 126 is utilized to represent a computing environment 110 utilizing a plurality of data templates, each template describing a different entity. For example, in an embodiment, a first data template is utilized to describe a resource, and a second data template is utilized to describe a principal. In an embodiment, the first data template is utilized to describe any resource in the computing environment 110, i.e., the first data template is utilized to represent the virtual machine 112, the serverless function 116, and the software container 114.

In certain embodiments, the security database 126 is implemented as a tabular database, a columnar database, a SQL database, a No-SQL database, a graph database, various combinations thereof, and the like. For example, in an embodiment, the security database 126 is a graph database, such as Neo4j®, where principals, resources, remediation actions, cybersecurity risks, cybersecurity objects, enrichments, endpoints, and the like, are stored as nodes on a graph stored in the security database 126. An example representation of a computing environment is discussed in more detail with respect to FIG. 2 below.

According to an embodiment, the inspection environment 120 further includes a generative remediator 128. In an embodiment, a generative remediator includes a generative artificial intelligence model, such as a large language model (LLM). In some embodiments, the LLM is, for example, OpenAI® ChatGPT®, Google® PaLM®, Meta® LLaMa®, and the like.

In certain embodiments, the generative remediator 128 is configured to generate a remediation action. In some embodiments, the generative remediator 128 is configured to generate the remediation action in response to detecting a cybersecurity threat, a cybersecurity risk, and the like, for example, based on detecting a cybersecurity object. In an embodiment, a cybersecurity threat includes a misconfiguration, a vulnerability, an exposure, various combinations thereof, and the like.

In some embodiments, a cybersecurity threat is detected in response to detecting a plurality of cybersecurity objects, a cybersecurity object and an attack path (e.g., an exposure), a cybersecurity object and a vulnerability, various combinations thereof, and the like. In an embodiment, such combinations are also referred to as toxic combinations.

In an embodiment, the generative remediator 128 is configured to generate a prompt for an LLM. In some embodiments, the prompt is generated based on a representation schema of the security database 126, a finding (e.g., a result of a cybersecurity inspection, such as detection of a cybersecurity object), a predefined action, a combination thereof, and the like.

According to an embodiment, the generative remediator 128 is configured to generate the prompt based on a predefined template. In an embodiment, generating a prompt based on a predefined template includes parsing an input received by the generative remediator 128, detecting therein values of data fields, and adapting the predefined template based on the detected data values.

In certain embodiments, it is advantageous to provide an LLM with a prompt that includes the data schema used for representation (i.e., the representation schema) as this reduces the need to fine-tune an LLM.

In some embodiments, the generative remediator 128 is further configured to initiate the remediation action. In certain embodiments, the remediation action is: initiated on a resource, initiated on a principal, a combination thereof, and the like.

For example, according to an embodiment, a remediation action includes: revoking access to a resource, revoking access from a resource, revoking access from a principal, revoking access to a principal, updating a permission of a principal, changing a user group of a principal, changing a role of a principal, revoking an access token, sandboxing a resource, configuring a firewall to filter traffic to the resource, configuring a firewall to filter traffic from the resource, generating an alert, installing a patch, removing a software application from a resource, updating a software package, removing a software package, a combination thereof, and the like.

In some embodiments, the inspection environment 120, the generative remediator 128, and the like, are configured to deploy a remediator 118 in the computing environment 110. For example, according to an embodiment, the remediator 118 is implemented as a serverless function, a software container, a virtual machine, a combination thereof, and the like.

In an embodiment, the remediator 118 is a workload which is configured to deploy, manage, expose, and the like, a remediation infrastructure in the computing environment 110. This is discussed in more detail with respect to FIG. 6 below.

In some embodiments, the remediator is configured to deploy a plurality of remediation actions, each remediation action including a remediation script. According to an embodiment, a remediation script includes a script, a code, an instruction, and the like, which when executed in the computing environment 110 remediates, attempts to remediate, etc., a cybersecurity issue detected therein.

In some embodiments, a first group of remediation actions are generated by the generative remediator 128, and a second group of remediation actions are predefined remediation actions.

Figure 2:
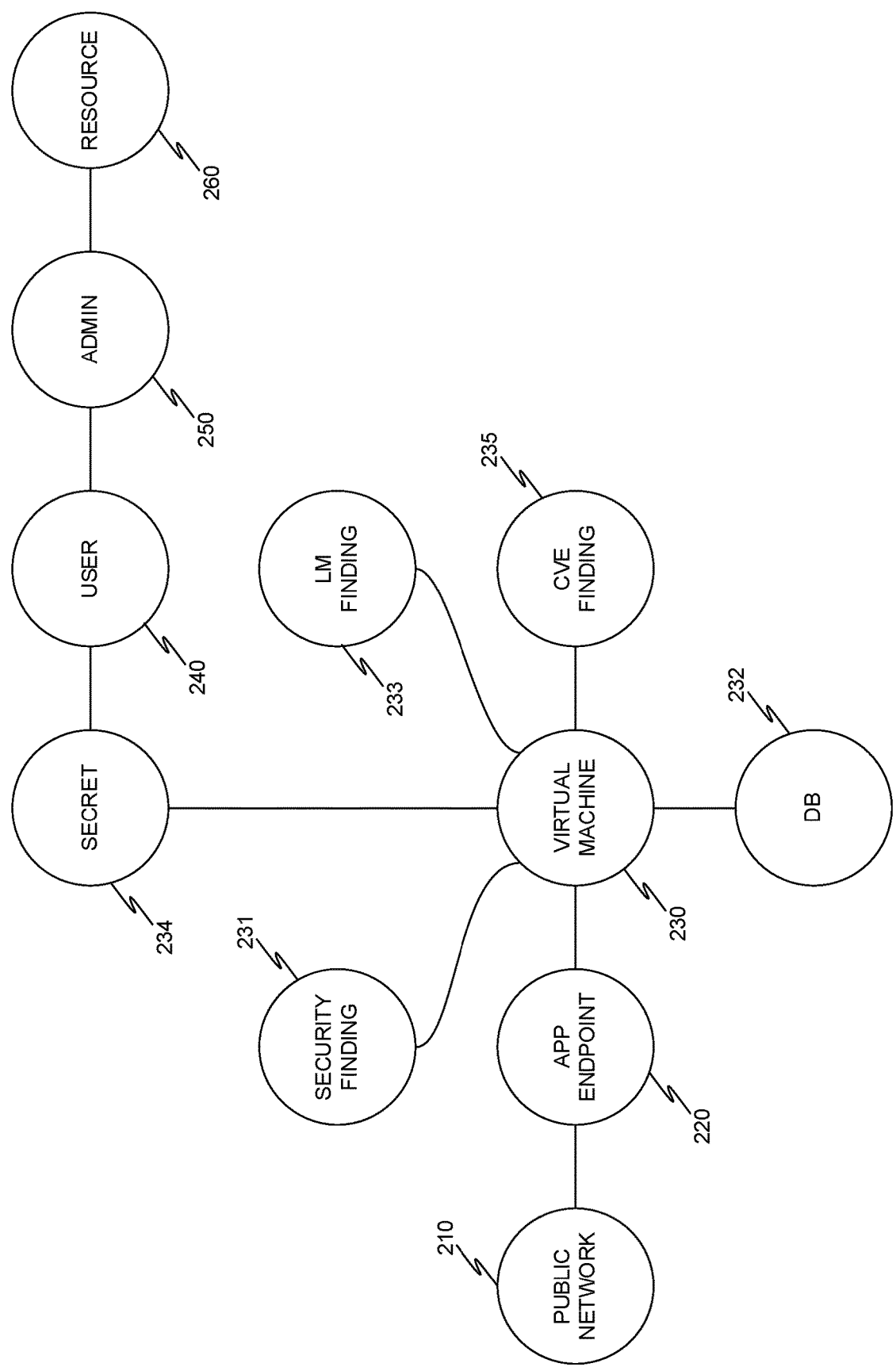
FIG. 2 is an example illustration of a security graph, implemented in accordance with an embodiment.

FIG. 2 is an example illustration of a security graph, implemented in accordance with an embodiment. In an embodiment, a virtual machine is inspected for cybersecurity objects, for example by an inspector discussed in more detail throughout.

According to an embodiment, an inspector, inspection controller, and the like, are configured to generate a representation of the virtual machine, for example as virtual machine (VM) node 230. In an embodiment, the inspector is configured to detect an application endpoint, represented as endpoint node 220. The application endpoint allows the virtual machine to connect to a public network, such as the internet. In an embodiment, the endpoint node 220 is connected to a public network node 210, which represents that the application endpoint can access the public network.

In some embodiments, the inspector is further configured to detect hosted technologies. For example, according to an embodiment, a hosted technology, such as a database, is represented by a hosted technology node. In some embodiments, a database is represented by database (DB) node 232, and the DB node 232 is connected to the VM node 230, to indicate that the DB is hosted on the VM.

According to an embodiment, an inspector is configured to detect a secret on the VM. In some embodiments, a single inspector is configured to detect multiple cybersecurity objects. In other embodiments, each inspector is configured to detect a single cybersecurity object.

In an embodiment, the detected secret is represented by a secret node 234, connected to the VM node 230. In some embodiments, the detected secret is associated with a user account, represented by user node 240. In an embodiment, the user account is configured to assume an administrator account, represented by admin node 250. In an embodiment, the administrator account is configured to access a resource, such as a bucket, which exposes the data therein. In some embodiments, the resource is represented by resource node 260.

In certain embodiments, an inspector is configured to detect a cybersecurity object which indicates that the VM includes a vulnerability, an exposure, a misconfiguration, and the like, represented, for example, by CVE (common vulnerabilities and exposures) node 235. For example, in an embodiment, the CVE node 235 represents a Log4Shell vulnerability in Log4j. The CVE node 235 is connected to the VM node 230, according to an embodiment, to indicate that the vulnerability was detected on the VM.

In some embodiments, a security finding is represented by security finding node 231. For example, according to an embodiment, a log, such as a network log, a cloud log, an event log, and the like, are accessed. In some embodiments, the log is parsed to detect an identifier of the VM.

In an embodiment, an event is detected in the log which corresponds to a security finding, respective of the identifier. For example, in an embodiment, a plurality of unsuccessful access events indicate that a brute force attack was attempted on the VM. In some embodiments, the security finding node 231 is connected to the VM node 230, to indicate that the security finding was detected with respect to the VM.

In certain embodiments, a security database is configured to detect a potential lateral movement path from the VM (VM node 230) to the resource (resource node 260) by gaining access to the VM, for example by brute force, gaining access to the secret stored thereon, and from there utilizing the user to gain admin access to the resource. In an embodiment, a lateral movement (LM) path, potential lateral movement path, and the like, are represented by an LM finding node 233, connected to the VM node 230, to indicate that a lateral movement path, for example, is present between the VM node 230 and another resource.

In some embodiments, a toxic combination is defined by a policy, a condition, a rule, a combination thereof, and the like. For example, in the above embodiment, a vulnerability combined with a secret is a higher cybersecurity risk than if either one of those findings were present individually.

It is advantageous to detect such toxic combinations, as they allow to initiate remediation actions at multiple points (e.g., each element of the toxic combination) to deal with the cybersecurity threat.

In certain embodiments, a node representing a finding, a cybersecurity risk, a cybersecurity object, and the like, is connected to a remediation node, wherein the remediation node represents a remediation action. In some embodiments, a generative remediator is configured to detect the remediation action based on the remediation node, and adapt a remediation action template to a specific finding, for example.

Figure 3:
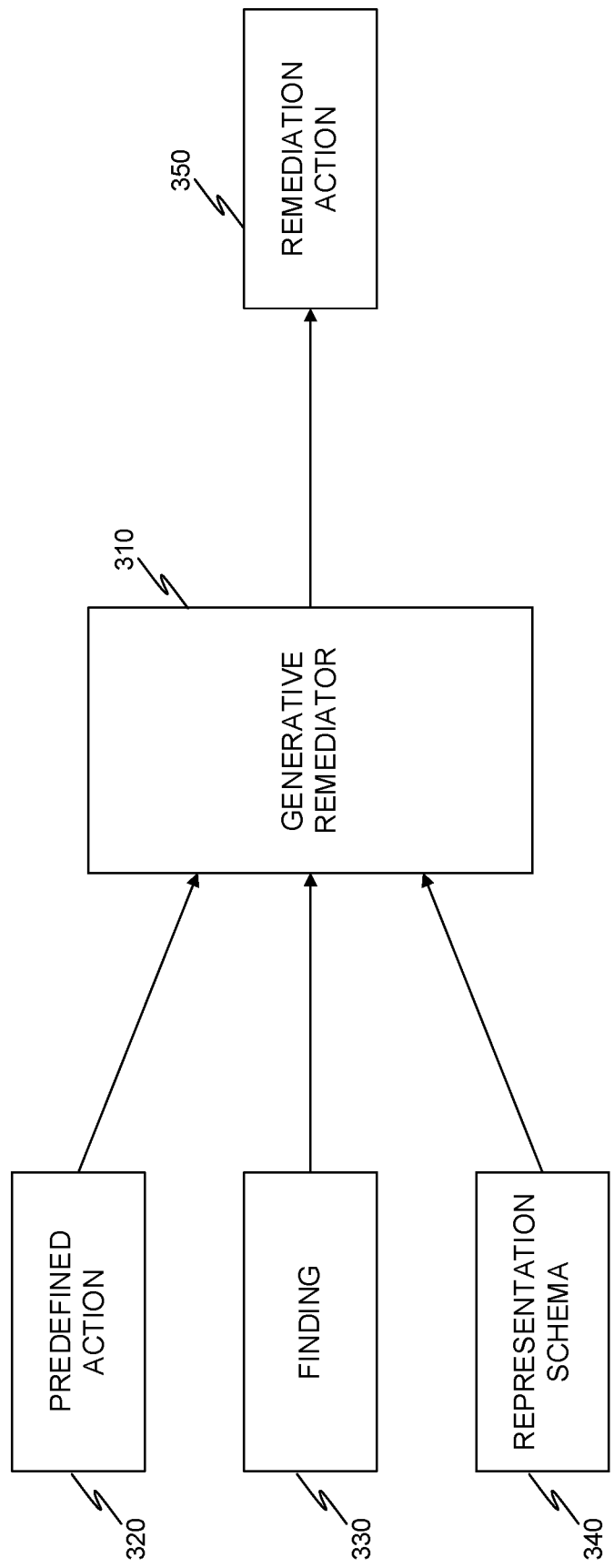
FIG. 3 is an example schematic diagram of a generative remediator data flow, implemented in accordance with an embodiment.

FIG. 3 is an example schematic diagram of a generative remediator data flow, implemented in accordance with an embodiment. In an embodiment, a generative remediator 310 is configured to receive a plurality of inputs. In some embodiments, a received input is a predefined action 320, a finding 330, a representation schema 340, a combination thereof, and the like.

In an embodiment, a predefined action 320 is a remediation action, a remediation script, an instruction, a combination thereof, and the like. In some embodiments, the predefined action 320 includes a template, a predefined value, a combination thereof, and the like.

In certain embodiments, a finding 330 is generated by a security graph, by an inspector, by an inspection controller, and the like, for example, based on a cybersecurity object detected in a computing environment.

In some embodiments, the finding 330 is a security finding, a lateral movement finding, a CVE finding, a privilege escalation finding, various combinations thereof, and the like.

In some embodiments, a security finding indicates a cybersecurity issue, a toxic combination of cybersecurity issues, and the like. For example, in an embodiment, a cybersecurity issue is a vulnerability, a misconfiguration, an exposure, an attack path, a combination thereof, and the like.

In an embodiment, a security finding is generated, for example, based on detecting an event in a log. A security finding is, for example, detecting a brute force attack (e.g., multiple failed login attempts). According to an embodiment, a lateral movement finding includes detecting a lateral movement path between a first resource and a second resource, for example by traversing a security graph in a security database to detect a potential lateral movement path. In an embodiment, a lateral movement finding includes a secret, a key, a principal, and the like, which connect the first resource to the second resource.

According to an embodiment, a representation schema includes a database schema, constraints, and the like, which are utilized to represent a computing environment, findings thereof, enrichments thereof, remediation actions, cybersecurity risks, cybersecurity threats, cybersecurity objects, and the like, in a security database.

In an embodiment, the generative remediator 310 is configured to receive a user input as a further input. For example, in an embodiment, a user input indicates a platform preference in which to remediate a cybersecurity issue.

In certain embodiments, a computing environment includes multiple platforms, such as CLI (command line interface), a cloud computing console, an infrastructure as code (IaC) platform, various combinations thereof, and the like. Additionally, in some embodiments, various remediation actions are deployable in a production environment, for example by instructing an admission controller, a sensor, and the like, to initiate the remediation action.

Therefore, according to an embodiment, a cybersecurity issue can be remediated from multiple points in an environment. For example, a cybersecurity issue can be detection of an exposure as a result of a misconfiguration (e.g., a database having sensitive data which is not password protected, hosted on a virtual machine having deployed thereon a sensor).

In an embodiment, remediating the cybersecurity issue above includes any of: configuring the sensor to set a password for the database, updating a code object in an IaC file (e.g., a Terraform® file), from which the VM with the hosted database was deployed to include password protection, etc. In certain embodiments, a user preference is determined respective of a platform in which to remediate the cybersecurity issue. In some embodiments, a plurality of preferred platforms are selected.

According to an embodiment, the generative remediator 310 is configured to generate a remediation action 350. In some embodiments, the remediation action 350 includes a remediation script, e.g., a plurality of code lines which when executed in a computing environment, remediate a cybersecurity issue.

In certain embodiments, the generative remediator 310 is configured to generate a plurality of remediation actions. In some embodiments, the generative remediator 310 is configured to generate a priority value for each of the plurality of remediation actions. For example, in an embodiment, a priority value is generated based on a past indicator of success. This is advantageous as remediation actions which were found in the past to be effective at remediating the cybersecurity issue, are likely effective for a current cybersecurity threat.

Figure 4:
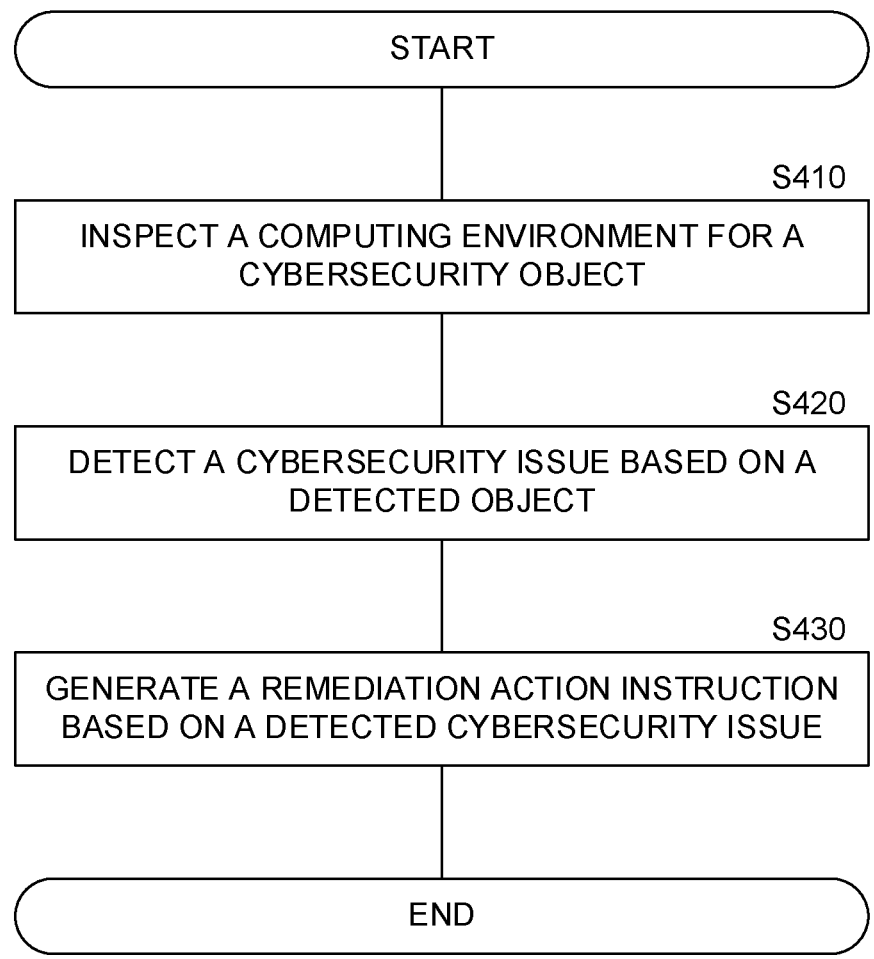
FIG. 4 is an example flowchart of a method for generating a remediation action, implemented in accordance with an embodiment.

FIG. 4 is an example flowchart of a method for generating a remediation action, implemented in accordance with an embodiment.

At S410, a computing environment is inspected for a cybersecurity object. In an embodiment, inspecting a computing environment for a cybersecurity object includes detecting a plurality of resources deployed in a computing environment.

In certain embodiments, detecting the plurality of resources includes, for example, entity discovery. In an embodiment, entity discovery includes querying an application programming interface (API) of a computing environment, such as a cloud computing environment, to determine what resources, workloads, and the like, are deployed therein.

For example, according to an embodiment, a cloud API is accessed to determine what virtual machines, software containers, serverless functions, microservices, buckets, storage, software repositories, and the like, are deployed in the computing environment.

In an embodiment, a resource is inspected to detect therein a nested resource. For example, in an embodiment, a virtual machine is configured to host a software container platform (e.g., Kubernetes), and each of the virtual machines, and the software containers deployed thereon, are individually inspected for cybersecurity objects.

In some embodiments, inspecting a computing environment includes generating an inspectable disk, based on an original disk which is deployed in the computing environment. In certain embodiments, generating an inspectable disk includes generating a clone, a copy, a snapshot, a combination thereof, and the like, of the original disk.

According to an embodiment, an inspectable disk is generated on-demand in response to a request for initiating inspection of the original disk, and a resource allocated to the inspectable disk is released in response to determining that inspection is complete.

In some embodiments, a plurality of inspectors are allocated to inspect an inspectable disk for a cybersecurity object, each inspector configured to inspect for a different cybersecurity object. For example, in an embodiment, a first inspector is configured to inspect for nested workloads, while a second inspector is configured to inspect for a secret.

In an embodiment, the cybersecurity object is a file, a secret, a password, a sensitive data, a code object, a hash, a key, a certificate, a registry file, a library, a software package, a binary, an application, an operating system, a malware, a nested workload, a combination thereof, and the like.

At S420, a cybersecurity issue is detected. In an embodiment, a cybersecurity issue is detected based on detection of a cybersecurity object. In some embodiments, the cybersecurity issue is detected based on a combination of detecting a cybersecurity object, and a finding. For example, in an embodiment, a finding is a security finding, a lateral movement finding, a privilege escalation finding, a vulnerability, an exposure, a misconfiguration, a malware, an attack path, various combinations thereof, and the like.

As an example, a combination, also known as a toxic combination, includes detecting a vulnerability, such as a hosted technology running an application which has a known vulnerability, together with an endpoint (e.g., indicating public network access), where the hosted technology is configured to assume a service account having a high permission.

In certain embodiments, detecting a toxic combination includes applying a policy, a rule, a condition, and the like, on a representation of a computing environment. In some embodiments, a security database is queried based, for example, on a preexisting query which is configured to detect a toxic combination. For example, in some embodiments, a security graph is traversed to detect nodes which correspond to a query directed at a security graph, such as the graph discussed in more detail with respect to FIG. 2 above.

In certain embodiments, multiple cybersecurity issues are detected. In some embodiments, each cybersecurity issue includes a priority score, a severity score, a combination thereof, and the like. For example, in an embodiment, a score is a qualitative score (e.g., low, medium, high), a quantitative score (e.g., 1 through 10), a combination thereof, and the like.

At S430, a remediation action is generated. In an embodiment, the remediation action is generated by a generative remediator configured to generate remediation actions. In some embodiments, the remediation action is generated based on the cybersecurity issue.

In an embodiment, a generative remediator is configured to receive a cybersecurity issue, including, for example, an identifier of a resource (e.g., a name in a namespace, an IP address, etc.), data pertaining to the cybersecurity object, and the like, and generate the remediation action based on the received input.

In some embodiments, the remediation action is generated based on a template, for example including a code template. In an embodiment, the code template includes machine-readable instructions, which when executed in a computing environment, such as a cloud computing environment, cause the remediation action to initiate.

In some embodiments, the generative remediator is configured to generate a prompt for a large language model (LLM), configured to generate a remediation action. In an embodiment, the prompt is generated based on a template, for example, based on the code template.

In some embodiments, a first LLM is utilized to generate the prompt, and a second LLM is utilized to generate the remediation action. In an embodiment, the first LLM and the second LLM are the same model.

In an embodiment, the prompt, when provided to an LLM model, configures the LLM model to generate an output which includes a remediation action. In an embodiment, the remediation action includes a remediation script, a plurality of remediation scripts, etc. In an embodiment, a remediation script includes code, such as high-level code. In some embodiments, high-level code scripts are, for example, Python® scripts.

Figure 5:
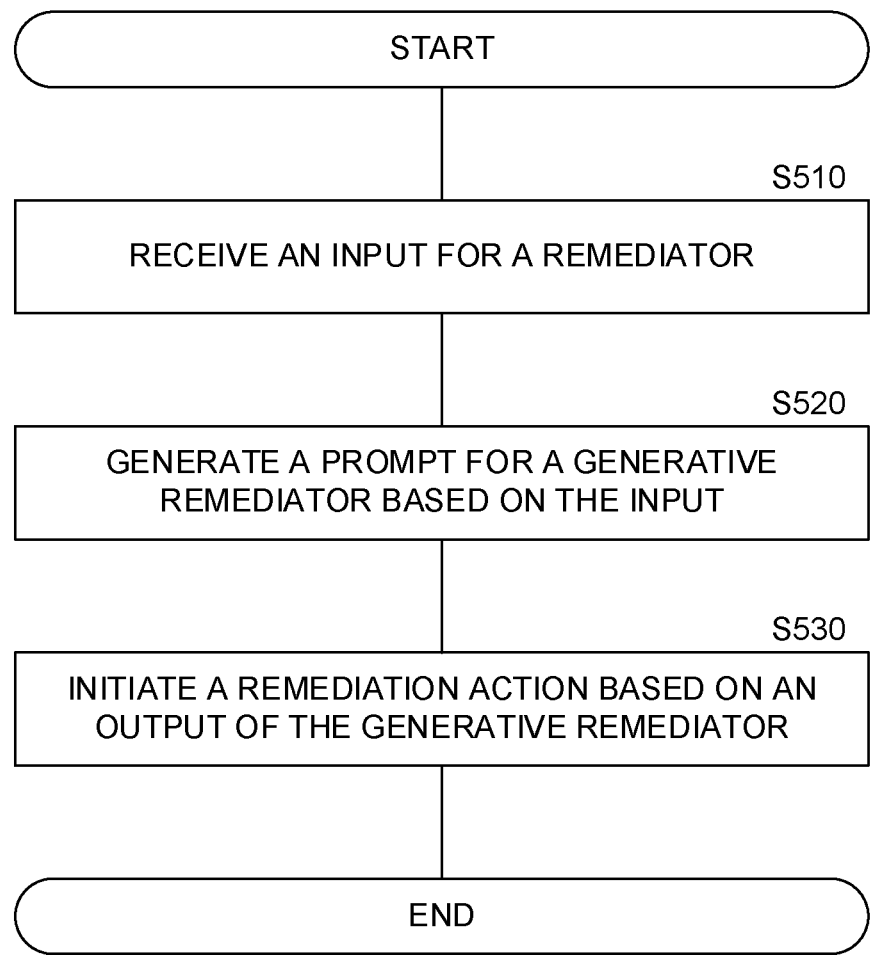
FIG. 5 is an example flowchart of a method for initiating a remediation action, according to an embodiment.

FIG. 5 is an example flowchart of a method for initiating a remediation action, according to an embodiment. In an embodiment, the initiated remediation action is generated by a generative remediator, discussed in more detail with respect to FIG. 4 above.

At S510, an input is received. In an embodiment, the received input is provided to a generative remediator. In some embodiments, the received input includes a cybersecurity issue, a cybersecurity alert, predefined action, a finding, a representation schema, a combination thereof, and the like.

In an embodiment, a predefined action is a remediation action, a remediation script, an instruction, a combination thereof, and the like. In some embodiments, the predefined action includes a template, a predefined value, a combination thereof, and the like.

In certain embodiments, a finding is generated by a security graph, by an inspector, by an inspection controller, and the like, for example based on a cybersecurity object detected in a computing environment.

In some embodiments, the finding is a security finding, a lateral movement finding, a CVE finding, a privilege escalation finding, various combinations thereof, and the like. In some embodiments, a security finding indicates a cybersecurity issue, a toxic combinations of cybersecurity issues, and the like. For example, in an embodiment, a cybersecurity issue is a vulnerability, a misconfiguration, an exposure, an attack path, a combination thereof, and the like.

In an embodiment, a security finding is generated, for example, based on detecting an event in a log. A security finding is, for example, detecting a brute force attack (e.g., multiple failed login attempts). According to an embodiment, a lateral movement finding includes detecting a lateral movement path between a first resource and a second resource, for example by traversing a security graph in a security database to detect a potential lateral movement path.

In an embodiment, a lateral movement finding includes a secret, a key, a principal, and the like, which connect the first resource to the second resource.

According to an embodiment, a representation schema includes a database schema, constraints, and the like, which are utilized to represent a computing environment, findings thereof, enrichments thereof, remediation actions, cybersecurity risks, cybersecurity threats, cybersecurity objects, and the like, in a security database.

In an embodiment, a generative remediator is configured to receive a user input as a further input. For example, in an embodiment, a user input indicates a platform preference in which to remediate a cybersecurity issue.

At S520, a prompt is generated. In an embodiment, the prompt is generated by a first LLM, and provided as an input to a second LLM. In some embodiments, the first LLM is the second LLM.

In some embodiments, the generative remediator is configured to generate a prompt for a large language model (LLM), configured to generate a remediation action. In an embodiment, the prompt is generated based on a template, for example based on the code template.

In an embodiment, the prompt, when provided to an LLM model, configures the LLM model to generate an output which includes a remediation action. In an embodiment, the remediation action includes a remediation script, a plurality of remediation scripts, etc. In an embodiment, a remediation script includes code, such as high-level code. In some embodiments, high-level code scripts are, for example, Python® scripts.

At S530, a remediation action is initiated. In an embodiment, the remediation action is generated based on an output of the LLM. For example, according to an embodiment, providing an LLM with the generated prompt of S520 configures the LLM to generate an output which includes a remediation action.

In an embodiment, initiating a remediation action includes executing an instruction, a plurality of instructions, and the like, in a computing environment. In certain embodiments, the initiated remediation action is initiated with respect to a computing platform of a plurality of computing platforms deployed in the computing environment. For example, a computing environment is, according to an embodiment, a command line interface (CLI), an infrastructure as code (IaC) platform, a console, a sensor, an admission controller, a combination thereof, and the like.

Figure 6:
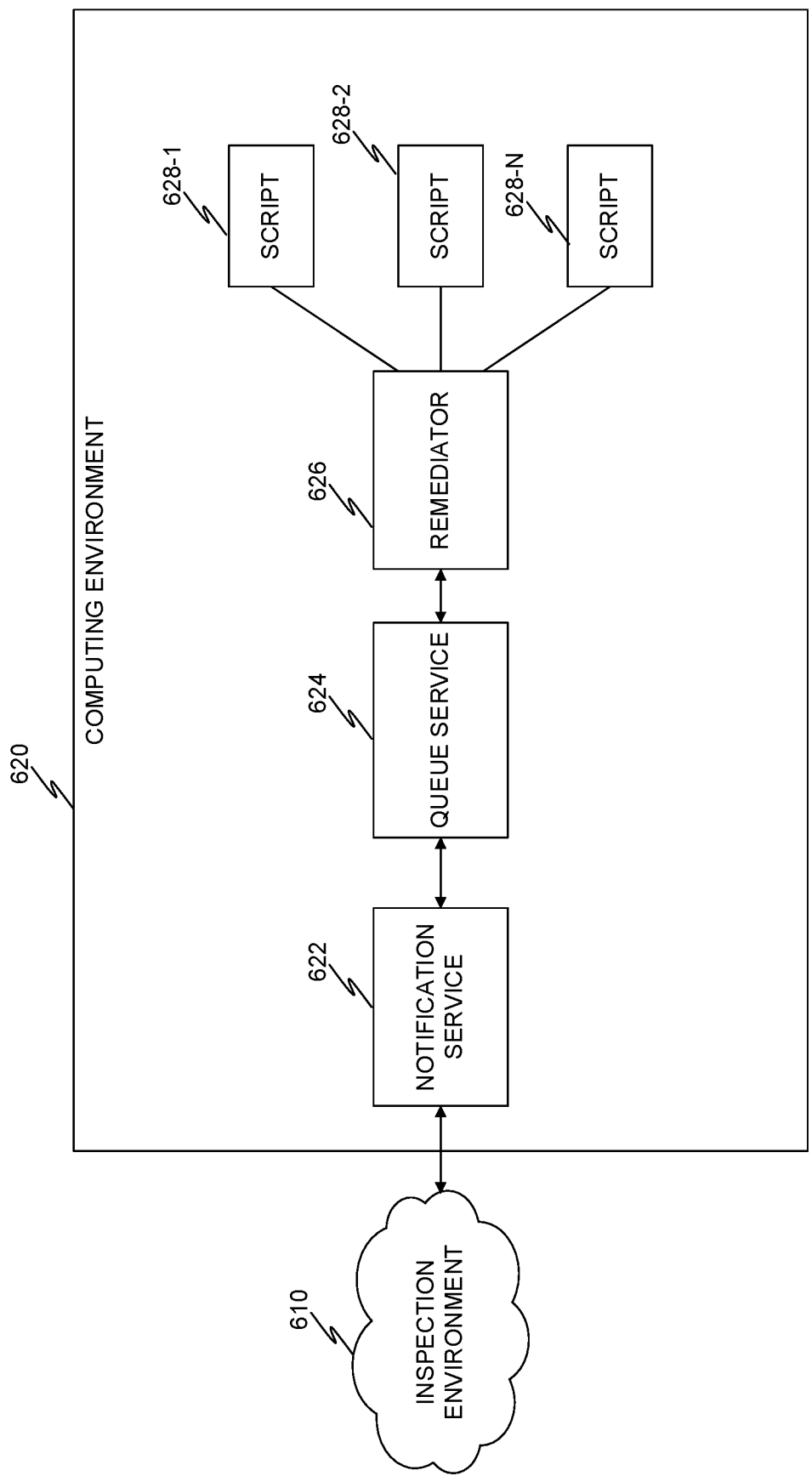
FIG. 6 is an example schematic illustration of a data flow of a remediation infrastructure deployed in a computing environment, implemented in accordance with an embodiment.

FIG. 6 is an example schematic illustration of a data flow of a remediation infrastructure deployed in a computing environment, implemented in accordance with an embodiment. In some embodiments, an inspection environment 610 is configured to deploy a remediation infrastructure in a computing environment 620.

For example, in an embodiment, the inspection environment 610 is configured to generate a workload, such as a remediator 626 for deployment in a computing environment 620. In certain embodiments, this is advantageous as it does not require that the inspection environment be granted permissions to access the entire computing environment 620, and rather the organization of the computing environment 620 can deploy the remediator workload 626 in accordance with the organization's standards and best practices.

In some embodiments, the remediator 626 is configured to communicate with a queue service 624. In an embodiment, the queue service 624 is configured to communicate with a notification service 622. In certain embodiments, the queue service 624 and the notification service 622 are implemented as a single queuing service, shown here as separate entities merely for convenience. In an embodiment, the notification service 622 is, for example Amazon® short notification service (SNS). In some embodiments, the queue service 624 is Amazon® short queue service (SQS).

In certain embodiments, each component of the remediation infrastructure is configured to receive data from a single source and send data to a single destination. For example, the queue service 624 is configured to send, store, receive, etc. messages between software components in a computing environment (e.g., between the notification service 622 and the remediator 626).

In some embodiments, the notification service 622 is configured to send, store, receive, etc. messages between a software component of the computing environment 620 and a software component of the inspection environment 610. According to an embodiment, the remediator 626 is configured to deploy a plurality of remediation actions. In some embodiment, each remediation action corresponds to a script, a plurality of scripts, and the like, such as the plurality of remediation scripts 628-1 through 628-N, where 'N' is a natural number having a value of '2' or greater.

In certain embodiments, the remediator 626 is configured to initiate remediation actions, for example by executing a script 628-2. In some embodiments, the remediator 626 is configured to determine an outcome of executing the script 628-2. For example, in an embodiment, the remediator 626 is configured to detect in a log, such as an activity log, a cloud log, a network log, an identity and access management log, a combination thereof, and the like, a result of a remediation action.

In some embodiments, a remediation action includes a determined effect. For example, a determined effect (also referred to as outcome, feedback, etc.) of changing a permission associated with a user account includes, according to an embodiment, a record in a log indicating that a user account having a first permission set was modified to include a second permission set. In such embodiments, the remediator 626 is further configured to detect the determined effect, for example by parsing a log, detecting a log record, detecting an artifact in a computing environment, etc.

In some embodiments, the remediator 626 is configured to determine if a remediation action was successful or was unsuccessful. For example, in an embodiment, the remediator 626 is configured to determine success of the remediation action execution based on the determined outcome of executing the remediation action.

In an embodiment, the outcome of executing the remediation action is provided to the inspection environment 610. In certain embodiments, the inspection environment 610 is configured to update a security database based on the outcome of the remediation action. For example, where the remediation action is successful with respect to a cybersecurity issue, the cybersecurity issue is removed from a representation of the computing environment stored in the security database.

Figure 7:
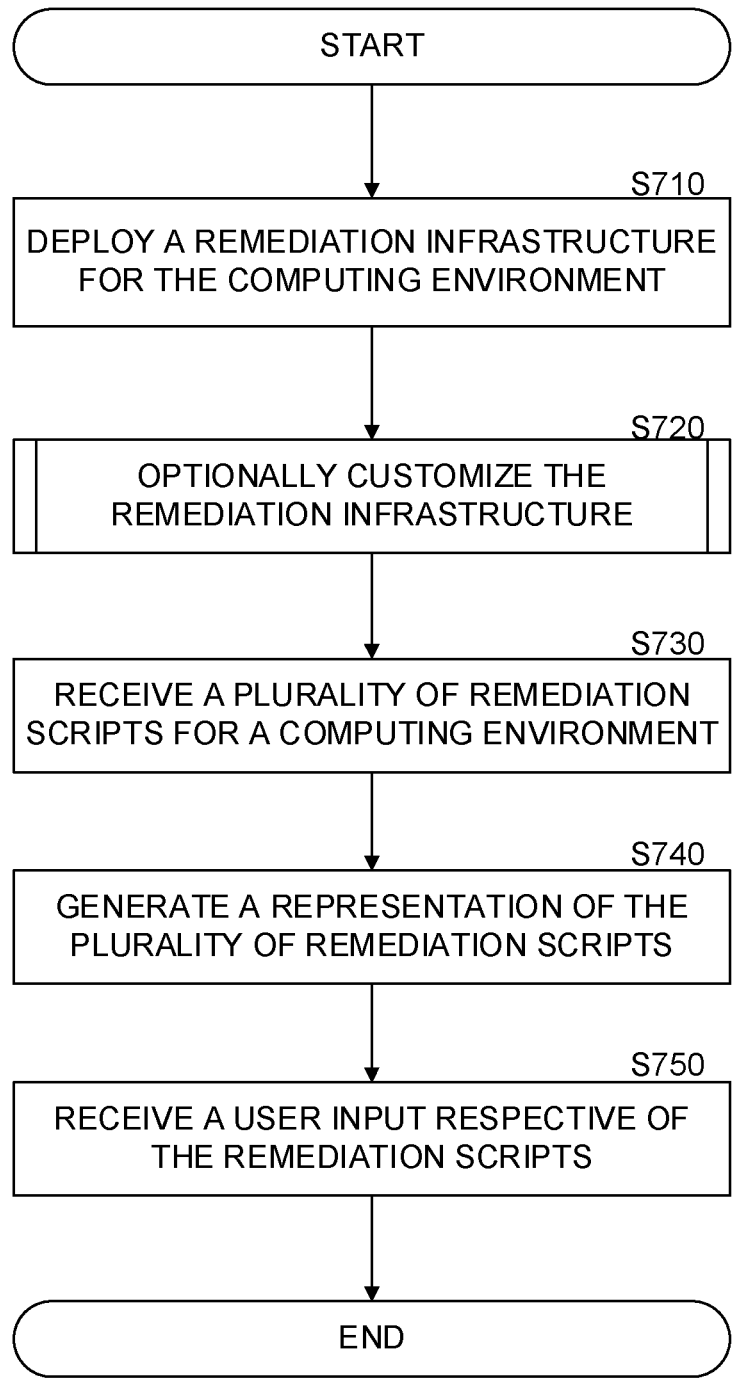
FIG. 7 is an example flowchart of a method for deploying and utilizing a remediation infrastructure in a computing environment, implemented in accordance with an embodiment.

FIG. 7 is an example flowchart of a method for deploying and utilizing a remediation infrastructure in a computing environment, implemented in accordance with an embodiment.

At S710, a remediation infrastructure is deployed in a computing environment. In some embodiments, the remediation infrastructure includes: a plurality of remediation actions, a plurality of remediation scripts, a workload, a queueing service, a notification service, a combination thereof, and the like.

In some embodiments, a selection is received to select a group of the plurality of remediation scripts. This is useful where, for example, the plurality of remediation scripts includes scripts which are not applicable to a particular deployed computing environment, deployed computing platform, and the like.

In an embodiment, the workload is configured to initiate remediation actions in the computing environment, and communicate with an inspection environment, for example through a queueing and notification service.

According to some embodiments, the workload is configured to send an identifier of each remediation script, each remediation action, each active remediation script, each active remediation action, each inactive remediation script, each inactive remediation action, various combinations thereof, and the like. For example, in some embodiments, the workload is configured to send identifiers periodically, in response to a request from the inspection environment, a combination thereof, and the like.

At optional S720, the remediation infrastructure is customized. In certain embodiments, the remediation infrastructure is customized by selecting a workload which is deployable in the computing environment. For example, in an embodiment, a remediation infrastructure includes a serverless function, a software container, and a virtual machine, each of which is configured to perform the functions of the remediator.

In an embodiment, a workload type is determined based on the computing environment, based on a resource allocation of the computing environment, and the like. In some embodiments, the remediation actions are customized. In an embodiment, customizing a remediation action includes providing a custom remediation action. In some embodiments, customizing a remediation action includes selecting a group of remediation actions from a plurality of remediation actions, such that the group of remediation actions are executable in the computing environment.

At S730, a plurality of remediation scripts are deployed in the computing environment. In an embodiment, deploying a plurality of remediation scripts includes sending a remediation script from an inspection environment to a remediator via the remediation infrastructure. In some embodiments, remediation scripts are deployed continuously, periodically, on demand, a combination thereof, and the like.

In certain embodiments, a deployed remediation script includes a unique identifier, such as a globally unique identifier, locally unique identifier, etc. In an embodiment, a globally unique identifier is unique across multiple computing environment, while a locally unique identifier is unique within a single computing environment.

At S740, a representation of the remediation scripts is generated. In an embodiment, the representation includes a visual representation, for example for a graphical user interface (GUI) which is utilized to control the remediation infrastructure. For example, according to an embodiment, a GUI includes an indicator which is used to determine if a remediation script is active (i.e., the script is deployed in the computing environment and can be initiated) or inactive (i.e., the script is deployed in the computing environment and cannot be initiated).

In some embodiments, the GUI includes a disruptive indicator to indicate a degree of disruptiveness to the computing environment, to a resource thereof, to a principal thereof, and the like, caused by initiating a remediation action. In certain embodiments, the disruptive indicator includes a value. In an embodiment, the value is a binary value (e.g., true/false). In some embodiments, the value is qualitative (e.g., low, high, etc.), quantitative (e.g., 1 through 10), a combination thereof, and the like.

According to an embodiment, the GUI further includes an indicator of what user accounts, user groups, user roles, etc., are configured with a permission to initiate the remediation action, remediation script, and the like, in the computing environment. In some embodiments, an input received through the GUI configures the inspection environment to deploy a change in the remediation infrastructure.

At S750, a user input is received. In an embodiment, the user input is received through the GUI. In some embodiments, a user input received via a GUI configures the inspection environment to deploy a change in the remediation infrastructure.

According to an embodiment, a change in the remediation infrastructure includes updating a remediation action, updating a remediation script, changing a permission associated with a remediation action, changing a permission associated with a remediation script, deploying a new remediation action, deploying a new remediation script, deleting a remediation action, deleting a remediation script, initiating a remediation action, initiating a remediation script, providing a remediation action, providing a remediation script, a combination thereof, and the like.

Figure 8:
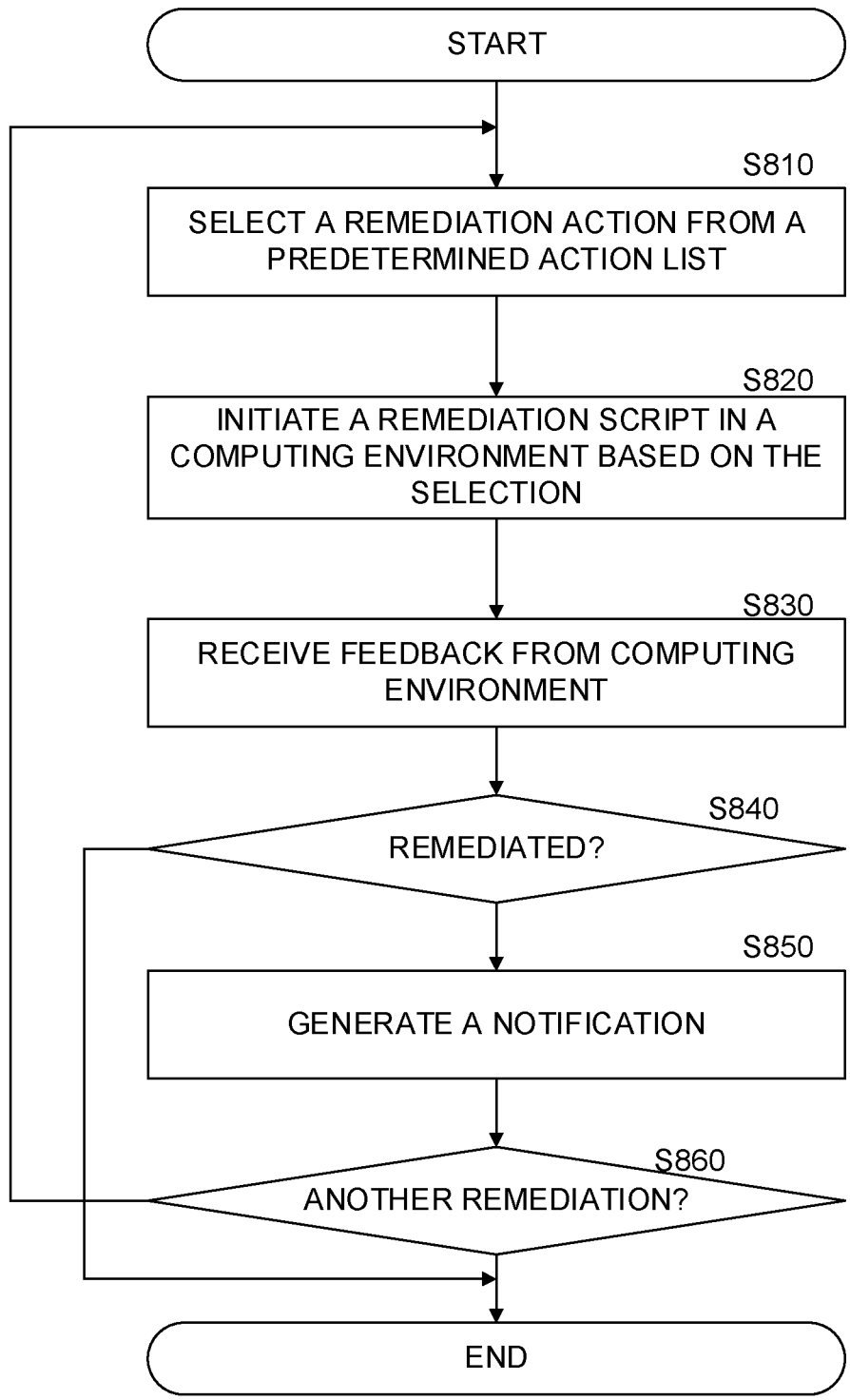
FIG. 8 is an example flowchart of a method for providing a remediation feedback from a computing environment to an inspection environment, implemented in accordance with an embodiment.

FIG. 8 is an example flowchart of a method for providing a remediation feedback from a computing environment to an inspection environment, implemented in accordance with an embodiment.

At S810, a remediation action is selected. In an embodiment, the remediation action is selected from a list of predetermined remediation actions. In some embodiments, the remediation action includes one or more remediation scripts. In an embodiment, the remediation action is generated by a generative remediator, such as discussed in more detail herein.

According to an embodiment, the remediation action is selected in response to detecting a cybersecurity issue. In some embodiments, a remediation action is selected from a plurality of remediation actions. In certain embodiments, a cybersecurity issue includes a plurality of applicable remediation actions, each remediation action applicable to a unique computing platform of the computing environment.

In an embodiment, a check is performed to determine if a previous remediation action was selected from the cybersecurity issue. In some embodiments, a remediation action fails to remediate the cybersecurity issue, and therefore it is advantageous to initiate a second, different, remediation action in order to remediate the cybersecurity issue.

At S820, a remediation script is initiated. In an embodiment, initiating a remediation script includes executing a script, a code, and the like, in the computing environment.

In some embodiments, a remediation script configures the computing environment to revoke access to a resource, revoke access from a resource, revoke access from a principal, revoke access to a principal, update a permission of a principal, change a user group of a principal, change a role of a principal, revoke an access token, sandbox a resource, configure a firewall to filter traffic to the resource, configure a firewall to filter traffic from the resource, generate an alert, install a patch, remove a software application from a resource, update a software package, remove a software package, a combination thereof, and the like.

In certain embodiments, a remediation action, remediation script, and the like, are initiated by principals in the computing environment. For example, in some embodiments, a first group of principals (e.g., a first user group) includes a permission, a permission set, and the like, which authorize the first group of principals to initiate a first group of remediation actions. In some embodiments, the permission, permission set, and the like, authorize the first group of principals to initiate only the first group of remediation actions.

According to some embodiments, a degree of disruptiveness is determined for each remediation action, each remediation script, a combination thereof, and the like. In some embodiments, a permission for initiating a remediation action is further determined based on a degree of disruptiveness. For example, according to an embodiment, only users associated with a first role are provided with a permission to initiate a remediation action having a disruptiveness degree of "high".

In certain embodiments, a condition of the computing environment is detected. In an embodiment, a condition is network bandwidth utilization (for example as an indicator of activity), number of logged-on user accounts, number of resources utilized, number of resources available, type of computing environment (e.g., cloud, on-prem, hybrid, VPC, etc.), type of computing infrastructure (e.g., bare metal, AWS, GCP, etc.), various combinations thereof, and the like. In an embodiment, a permission is further determined based on a condition of the computing environment. For example, according to an embodiment, a remediation action is completely enabled for a first user group, completely disabled for a first user group, etc., based on the determined condition.

In some embodiments, permission to initiate a remediation action is determined based on a combination of a degree of disruptiveness and a condition of the computing environment. In an embodiment, permissions are determined continuously, periodically, ad-hoc, a combination thereof, and the like.

At S830, a feedback is received from the computing environment. In an embodiment, a feedback includes an indication of success respective of the remediation action. In some embodiments, a feedback is generated by a remediator deployed in the computing environment as part of a deployed remediation infrastructure.

In certain embodiments, a feedback, outcome, determined effect, and the like, is determined in the computing environment by detecting an event in an event log, detecting an artifact, and the like.

For example, a determined effect (also referred to as outcome, feedback, etc.) of changing a permission associated with a user account includes, according to an embodiment, a record in a log indicating that a user account having a first permission set was modified to include a second permission set. In such embodiments, the remediator 626 is further configured to detect the determined effect, for example by parsing a log, detecting a log record, detecting an artifact in a computing environment, etc.

At S840, a check is performed to determine if the cybersecurity issue is remediated. In an embodiment, the check is performed based on the received feedback. In an embodiment, where the cybersecurity issue is remediated, execution ends. In some embodiments, where the cybersecurity issue is not remediated (e.g., the remediation action execution was unsuccessful), execution continues at S850.

At S850, a notification is generated. In an embodiment, the notification includes an email, an alert, a ticket, and the like, to indicate that the remediation action was unsuccessful. In some embodiments, the notification indicates that the remediation action failed to remediate the cybersecurity threat.

At S860, a check is performed to determine if another remediation action should be initiated. This is advantageous where a previous remediation action failed, or was otherwise unsuccessful. In an embodiment, if 'yes', execution continues at S810 by selecting a different remediation action. In some embodiments, where 'no', execution ends.

Figure 9:
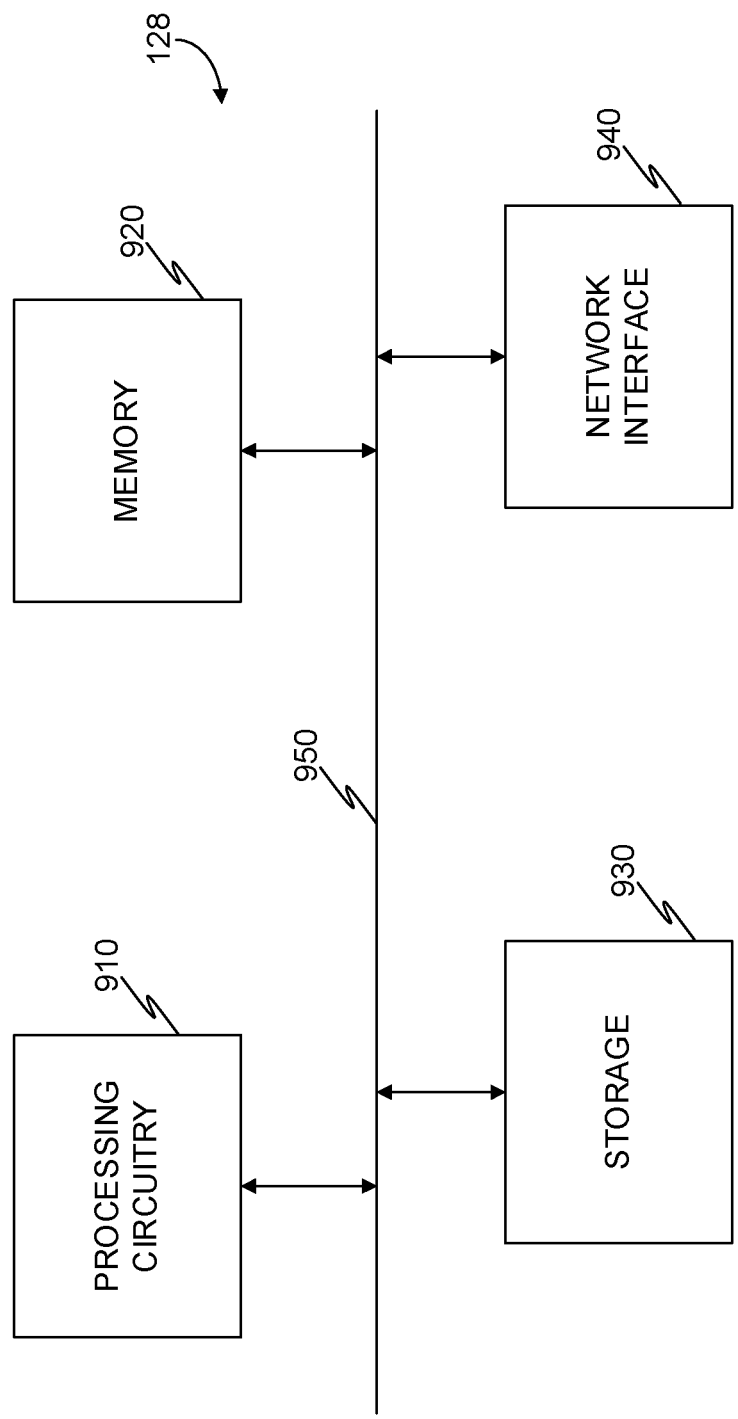
FIG. 9 is an example schematic diagram of a generative remediator according to an embodiment.

FIG. 9 is an example schematic diagram of a generative remediator 128 according to an embodiment. The generative remediator 128 includes a processing circuitry 910 coupled to a memory 920, a storage 930, and a network interface 940. In an embodiment, the components of the generative remediator 128 may be communicatively connected via a bus 950.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 920 may be volatile (e.g., random access memory, etc.), non-volatile (e.g., read only memory, flash memory, etc.), or a combination thereof. In an embodiment, the memory 920 is an on-chip memory, an off-chip memory, a combination thereof, and the like. In certain embodiments, the memory 920 is a scratch-pad memory for the processing circuitry 910.

In one configuration, software for implementing one or more embodiments disclosed herein may be stored in the storage 930, in the memory 920, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, cause the processing circuitry 910 to perform the various processes described herein.

The storage 930 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 940 is configured to provide the generative remediator 128 with communication with, for example, the inspector 122, the inspection controller 124, the security database 126, the remediator 118, and the like.

It should be understood that the embodiments described herein are not limited to the specific architecture illustrated in FIG. 9, and other architectures may be equally used without departing from the scope of the disclosed embodiments.

Furthermore, in certain embodiments the inspector 122, the inspection controller 124, the security database 126, the remediator 118, and the like, may be implemented with the architecture illustrated in FIG. 9. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for initiating remediation actions in response to a cybersecurity issue in a computing environment, comprising:
configuring a virtual instance in a computing environment to communicate with an inspection environment;
configuring the virtual instance to receive in the computing environment a plurality of remediation scripts from the inspection environment;
generating a remediation infrastructure including a plurality of remediation actions, each remediation action corresponding to at least a remediation script of the plurality of remediation scripts;
detecting a cybersecurity issue in the computing environment;
configuring the virtual instance to initiate a remediation action of the plurality of remediation actions, based on detecting the cybersecurity issue; and
receiving a feedback in the inspection environment from the virtual instance in response to initiating the remediation action.

2. The method of claim 1, further comprising:
inspecting the computing environment for a cybersecurity object, wherein the cybersecurity object indicates the cybersecurity issue.

3. The method of claim 1, further comprising:
associating a first group of remediation actions of the plurality of remediation actions with a first group of user accounts; and
associating a second group of remediation actions of the plurality of remediation actions with a second group of user accounts, wherein each group of user accounts is authorized to initiate only a remediation action associated with the respective user group.

4. The method of claim 3, further comprising:
disabling a first remediation action of the plurality of remediation actions.

5. The method of claim 4, further comprising:
detecting a condition in the computing environment; and
disabling the first remediation action based on the detected condition.

6. The method of claim 5, further comprising:
enabling a second remediation based on the detected condition.

7. The method of claim 3, further comprising:
disabling a first remediation action of the plurality of remediation actions only for the first group of user accounts.

8. The method of claim 3, further comprising:
associating a first remediation action with the first user group, wherein the first user group is authorized to initiate the first remediation action only on a first preauthorized resource in the computing environment.

9. The method of claim 8, further comprising:
associating the first remediation action with the second user group, wherein the second user group is authorized to initiate the first remediation action on any resource in the computing environment.

10. The method of claim 8, further comprising:
associating the first remediation action with the second user group, wherein the second user group is authorized to initiate the first remediation action only on a second preauthorized resource, which is different from the first preauthorized resource.

11. The method of claim 1, further comprising:
generating an indicator value for each remediation action, the indicator value indicating a determined degree of disruption of the remediation action.

12. The method of claim 11, further comprising:
providing a permission to initiate a first remediation action to a first principal, in response to determining that a determined degree of disruption of the first remediation action is at, or exceeds, a threshold value.

13. The method of claim 12, further comprising:
providing the permission to the first principal only in response to detecting a condition in the computing environment.

14. The method of claim 1, further comprising:
configuring the virtual instance to receive a customized remediation script.

15. The method of claim 1, further comprising:
initiating a second remediation action, in response to the feedback indicating that the remediation action was unsuccessful.

16. The method of claim 1, further comprising:
generating a notification, in response to the feedback indicating that the remediation action was successful.

17. The method of claim 1, further comprising:
configuring the virtual instance to send a status report respective of the remediation infrastructure.

18. A non-transitory computer-readable medium storing a set of instructions for initiating remediation actions in response to a cybersecurity issue in a computing environment, the set of instructions comprising:
one or more instructions that, when executed by one or more processors of a device, cause the device to:
configure a virtual instance in a computing environment to communicate with an inspection environment;
configure the virtual instance to receive in the computing environment a plurality of remediation scripts from the inspection environment;
generate a remediation infrastructure including a plurality of remediation actions, each remediation action corresponding to at least a remediation script of the plurality of remediation scripts;
detect a cybersecurity issue in the computing environment;
configure the virtual instance to initiate a remediation action of the plurality of remediation actions, based on detecting the cybersecurity issue; and
receive a feedback in the inspection environment from the virtual instance in response to initiating the remediation action.

19. A system for initiating remediation actions in response to a cybersecurity issue in a computing environment comprising:
a processing circuitry;
a memory, the memory containing instructions that, when executed by the processing circuitry, configure the system to:
configure a virtual instance in a computing environment to communicate with an inspection environment;
configure the virtual instance to receive in the computing environment a plurality of remediation scripts from the inspection environment;
generate a remediation infrastructure including a plurality of remediation actions, each remediation action corresponding to at least a remediation script of the plurality of remediation scripts;
detect a cybersecurity issue in the computing environment;
configure the virtual instance to initiate a remediation action of the plurality of remediation actions, based on detecting the cybersecurity issue; and
receive a feedback in the inspection environment from the virtual instance in response to initiating the remediation action.

20. The system of claim 19, wherein the memory contains further instructions which when executed by the processing circuitry further configure the system to:
inspect the computing environment for a cybersecurity object, wherein the cybersecurity object indicates the cybersecurity issue.

21. The system of claim 19, wherein the memory contains further instructions which when executed by the processing circuitry further configure the system to:
associate a first group of remediation actions of the plurality of remediation actions with a first group of user accounts; and
associate a second group of remediation actions of the plurality of remediation actions with a second group of user accounts, wherein each group of user accounts is authorized to initiate only a remediation action associated with the respective user group.

22. The system of claim 21, wherein the memory contains further instructions which when executed by the processing circuitry further configure the system to:
disable a first remediation action of the plurality of remediation actions.

23. The system of claim 22, wherein the memory contains further instructions which when executed by the processing circuitry further configure the system to:
detect a condition in the computing environment; and
disable the first remediation action based on the detected condition.

24. The system of claim 23, wherein the memory contains further instructions which when executed by the processing circuitry further configure the system to:
enable a second remediation based on the detected condition.

25. The system of claim 21, wherein the memory contains further instructions which when executed by the processing circuitry further configure the system to:
disable a first remediation action of the plurality of remediation actions only for the first group of user accounts.

26. The system of claim 21, wherein the memory contains further instructions which when executed by the processing circuitry further configure the system to:
associate a first remediation action with the first user group, wherein the first user group is authorized to initiate the first remediation action only on a first preauthorized resource in the computing environment.

27. The system of claim 26, wherein the memory contains further instructions which when executed by the processing circuitry further configure the system to:
associate the first remediation action with the second user group, wherein the second user group is authorized to initiate the first remediation action on any resource in the computing environment.

28. The system of claim 26, wherein the memory contains further instructions which when executed by the processing circuitry further configure the system to:
associate the first remediation action with the second user group, wherein the second user group is authorized to initiate the first remediation action only on a second preauthorized resource, which is different from the first preauthorized resource.

29. The system of claim 19, wherein the memory contains further instructions which when executed by the processing circuitry further configure the system to:
generate an indicator value for each remediation action, the indicator value indicating a determined degree of disruption of the remediation action; and
provide a permission to initiate a first remediation action to a first principal, in response to determining that a determined degree of disruption of the first remediation action is at, or exceeds, a threshold value.

30. The system of claim 19, wherein the memory contains further instructions which when executed by the processing circuitry further configure the system to:

initiate a second remediation action, in response to the feedback indicating that the remediation action was unsuccessful.

\* \* \* \* \*